United States Patent [19]
Citron et al.

[11] Patent Number: 5,515,030
[45] Date of Patent: May 7, 1996

[54] ELECTRONIC SEAL

[75] Inventors: Howard M. Citron, Katonah; Henry R. Baietto, Northport, both of N.Y.

[73] Assignee: NYNEX Science & Technology, Inc., White Plains, N.Y.

[21] Appl. No.: 45,642

[22] Filed: Apr. 9, 1993

[51] Int. Cl.$^6$ .................................................. G08B 13/08
[52] U.S. Cl. ..................... 340/545; 340/541; 340/568; 340/652
[58] Field of Search ...................... 340/545, 541, 340/570, 568, 572, 652, 540, 555, 562; 379/147, 33, 37, 143; 292/307 R; 194/216

[56] References Cited

U.S. PATENT DOCUMENTS

| | | | |
|---|---|---|---|
| 4,118,692 | 10/1978 | Fitchett | 340/568 |
| 4,123,623 | 10/1978 | McElliott | 340/568 |
| 4,124,775 | 11/1978 | Zarouni | 379/147 |
| 4,926,458 | 5/1990 | Roger et al. | 379/146 |
| 4,928,299 | 5/1990 | Tansky et al. | 340/568 |
| 5,097,253 | 3/1992 | Eschbach et al. | 340/545 |
| 5,117,222 | 5/1992 | McCurdy et al. | 340/568 |
| 5,189,396 | 2/1993 | Stobbe | 340/568 |
| 5,311,168 | 5/1994 | Pease, Jr. et al. | 340/542 |

*Primary Examiner*—John K. Peng
*Assistant Examiner*—Benjamin C. Lee
*Attorney, Agent, or Firm*—Ohlandt, Greeley, Ruggiero & Perle

[57] ABSTRACT

A reusable electronic seal is provided for detecting whether the contents of a container may have been disturbed. In a preferred embodiment, the electronic seal is used in conjunction with a coin box of a pay telephone. The reusable electronic seal is adapted to permanently or removably attach to the lid of the coin box. The electronic seal includes a latch pin, a switch operatively connected to the latch pin, a timer chip operatively connected to the switch, a latch pin spring for securing the electronic seal to the latch of the coin box and for resetting the timer chip, and a crystal for generating a fixed frequency to the timer chip. The electronic seal further includes an infrared light emitting diode that modulates the light emitting diode and sends a signal to a communications device, and a phototransistor for reading the clock signal from the communications device and a battery for supplying power to the timer chip, the infrared light emitting diode, the phototransistor and the crystal.

26 Claims, 5 Drawing Sheets

ELECTRONIC SEAL

BACKGROUND OF THE INVENTION

1. Field of the Invention

This invention relates to an electronic seal and, in particular, to an electronic seal that detects whether an intruder has gained access to or tampered with the structure being protected. In a preferred embodiment, the electronic seal is used in connection with a coin box of a coin operated pay or public telephone.

The electronic seal is a reusable seal. In a preferred embodiment, the electronic seal has the ability to establish communications with a separate device or location. Also, the electronic seal lends itself to automation of the coin counting function.

2. Description of the Prior Art

Heretofore, the coin boxes of public or pay telephones have been sealed with either plastic seals or a fiber optic seal. At present, the least expensive option, plastic seals, cost from about $0.04 to about $0.10 per seal. Public telephones in the New York Telephone Company region presently use about 9000 seals per day. Obviously, this is very expensive.

There are three specific types of coin box seals available for public telephones. The first is a basic plastic seal. The second is a special heat sensitive plastic seal, while the third is an optical fiber seal.

The basic plastic seal is inserted into and closes around the latch of the coin box. It can only be removed by breaking, e.g. destroying, the seal. The heat sensitive plastic seal is inserted into the coin box latch. The box and seal are then placed into a device that deforms the seal so that it can not be removed without breaking the seal. Lastly, the fiber optic seal is also inserted into the coin box latch. This seal has an optic fiber that will not transmit light from end to end if the seal has been disturbed.

A significant problem with all three seals is that they must be discarded each time the coin box is opened. Specifically, these seals are throw away or nonreusable type seals. Thus, these seals require replacement when the coin box is opened even by authorized personnel. The requirement of continual replacement of these seals is, especially for the great many coin operated pay telephones, very costly. In addition, these three seals do not provide any additional information as to when the opening took place.

Known prior art patents provide complicated systems for tabulating and storing information concerning coins collected from coin operated pay telephones. For example, U.S. Pat. No. 4,123,623 titled Pay Telephone Alarm and Audit, which issued on Oct. 31, 1978 to S. I. McElliott, is directed to an alarm and audit system for compiling such information.

U.S. Pat. No. 4,124,775 titled Coin Box Removal Information Processing Arrangement, which issued on Nov. 7, 1978 to A. Zarouni, is directed to an arrangement for automatically processing a coin box removal signal from a coin telephone station to a central office so that a determination can be made of the exact number and types of coins in the coin box at the time the coin box is removed from the telephone.

Lastly, U.S. Pat. No. 4,928,299 titled Coin Operated Telephone Operation Monitoring Switch Mounting Arrangement, which issued on May 22, 1990 to J. L. Tansky, et al., is directed to an event monitoring system for pay telephones. The system has sensors that are attached to brackets. The sensors generate signals that indicate the removal of a front cover, a vault door and a coin box. A monitoring circuit for the sensors sends an indication to a central telephone office.

These patents provide complicated systems that do not deal with a seal that detects whether the coin box of a public telephone has been opened. They also fail to provide the reusable electronic seal of the present invention that can be removably or permanently placed in the lid of the coin box or be an integral part of the coin box lid.

Significantly, the present electronic seal is reusable, thus eliminating the costs associated with the above noted plastic and fiber optic seals, and is adapted to be removably secured to the coin box. Also, the present electronic seal can be designed for integration into an automated system that eliminates the labor costs of removing the old seals and installing the new seals.

SUMMARY OF THE INVENTION

It is a principal object of the present invention to provide an electronic seal that detects entry into an enclosed structure.

It is another object of the present invention to provide an electronic seal that is adapted to attach, removably or permanently, to the structure.

It is still another object of the present invention to provide such an electronic seal that is reusable.

It is yet another object of the present invention to provide such an electronic seal that detects whether the seal has been disturbed from the time of authorized installation to the time of authorized removal.

It is a further object of the present invention to provide such an electronic seal that provides information concerning an unauthorized entry.

It is a still further object of the present invention to provide such an electronic seal that is also a visual deterrent to any potential thief.

It is yet a further object of the present invention to provide such an electronic seal that is used in connection with a coin box or coin box lid of a coin operated pay telephone.

It is still yet a further object of the present invention to provide such an electronic seal that, in an alternative embodiment, lends itself to automation of the coin counting function.

In accordance with the principles of the present invention, the above and other objects are realized by a reusable device for detecting whether a door of a container has been opened. Preferably, the container is a coin box of a pay telephone, and the door is a lid of the coin box. The device comprising an electronic seal that is adapted to, as desired, removably or permanently, attach to the door of the container. The electronic seal includes a latch pin and a latch pin spring for securing the electronic seal to the latch of the coin box, and a switch that, when the latch pin is opened, stops power from reaching the timer chip. The electronic seal includes, for communications, a phototransistor and a light emitting diode for sending signals between the timer chip and an external communications device. The electronic seal also includes means for generating a fixed frequency to the timer chip that stabilizes oscillation to maintain the time accuracy of the timer chip, and means for supplying power to the timer chip, the infrared light emitting diode, the phototransistor and the generating means. The electronic seal preferably includes a plurality of resistors and capacitors and a plurality of diodes.

BRIEF DESCRIPTION OF THE DRAWINGS

The above and other features and aspects of the present invention will become more apparent upon reading the following detailed description in conjunction with the accompanying drawings in which.

DETAILED DESCRIPTION OF THE PREFERRED EMBODIMENTS

Figure 1:
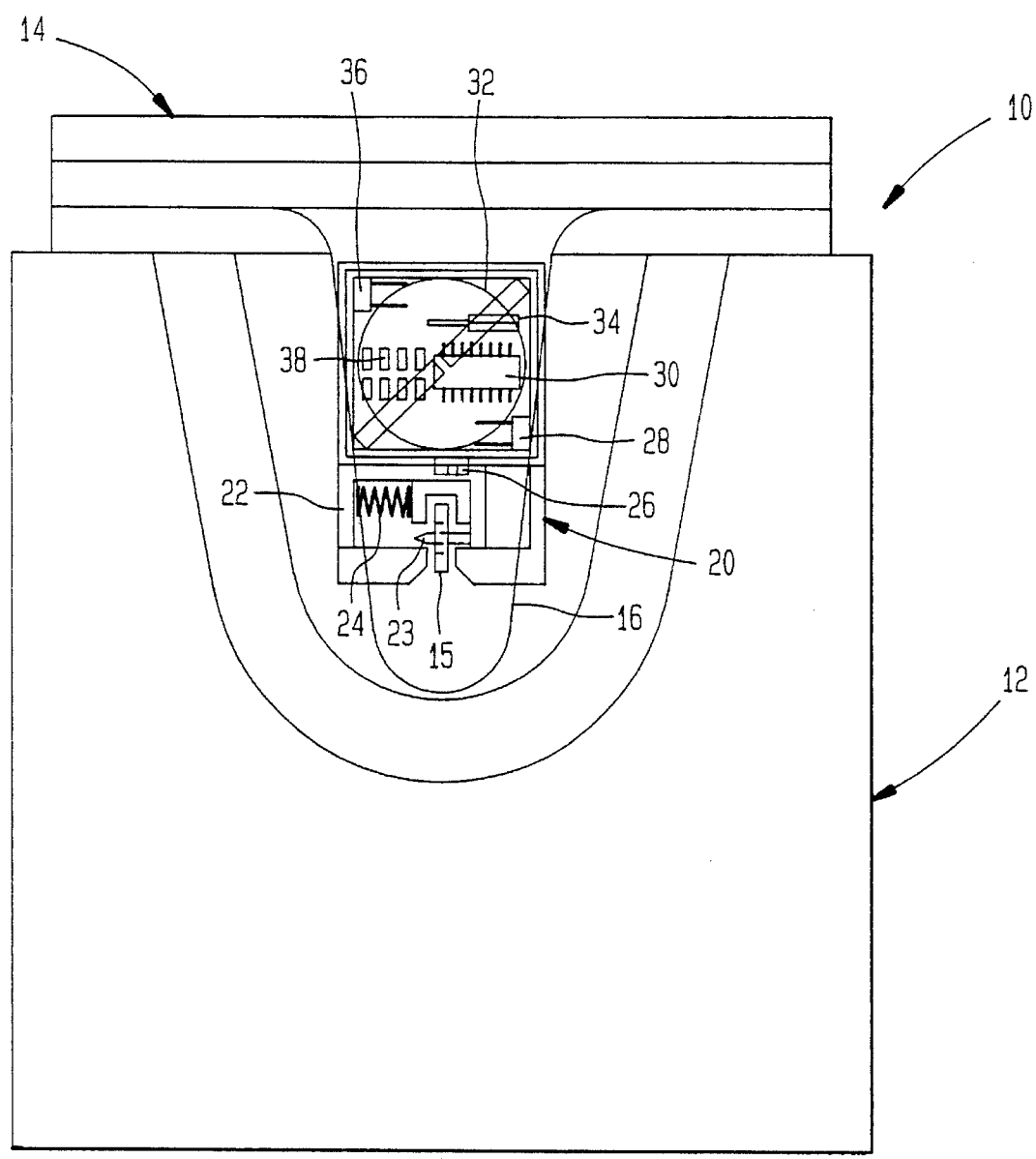
FIG. 1 is a front view of the coin box of a pay telephone that includes a top sectional view of the electronic seal of the present invention.

Referring to the figures and, in particular, FIG. 1, a conventional coin box for a pay telephone is generally represented by reference numeral 10.

The coin box 10 includes a body 12, a cover or lid 14 that is attached, preferably, by hinges (not shown) to the body. A latch or hasp 16 is provided that is either secured to or, preferably, is a part of lid 14. A closed loop 15 is secured to the front of the body 12. The latch 16 has an aperture through which the loop 15 fits. The latch 16 placed about the hasp 15 secures the lid 14 in its closed position on the body 12 so that access can not be gained into the body. The latch 16 has a latch area for placement of a coin box seal 20. According to the preferred embodiment of the present invention, the coin box seal 20 is an electronic seal. To open the latch 16 to gain access to inside the body 12, the coin box seal 20 must be removed.

The electronic seal 20 is made tamper resistant, and is designed to eliminate the temptation of one to vandalize the coin box 10. The electronic seal 20 is, preferably, made of high grade, stainless steel.

The electronic seal 20 can take a variety of physical forms. A preferred form is that of a small package, such as, for example, smaller than a digital watch. The electronic seal 20 attaches to the latch 16 of the coin box lid 14 and is removed upon opening. In an alternative embodiment, the electronic seal 20 can be built directly into the lid 14 as an integral part of the lid. In another alternative embodiment, the electronic seal 20 can be built into the coin box 10.

In the alternative embodiments, the electronic seal 20 will lend itself to serve two additional purposes. First, it will track every time the latch 16 or lid 14 of the coin box is opened and closed. Second, the electronic seal 20 will track every time the chute at the top of the lid of conventional pay telephone coin boxes is opened and closed to permit coins to enter the coin box.

As mentioned above, the electronic seal 20 can be used in other environments beside a public telephone coin box. In particular, the electronic seal 20 can be used in conjunction with other boxes or enclosures, such as, for example, cash boxes for automated teller machines, cargo crates, file cabinets and the like. Each of these type enclosures, preferably, have a security latch, and may not require a lock.

Referring to FIG. 1, the electronic seal 20 of the present invention includes a latch pin 22, a latch pin spring 24, a switch or switch contact 26, a timer chip 30, a power supply 32, and a crystal 34. To provide communications, the electronic seal 20 also includes a light emitting diode (LED) 28, preferably, infrared, and a phototransistor 36. There is also provided a plurality of resistors and capacitors shown collectively as reference numeral 38, and a plurality of diodes 48, shown in FIG. 3.

The electronic seal 20 has a body that is, preferably, thin because of the physical size constraints. In the most preferred embodiment, the body of the electronic seal 20 is made of stainless steel and is similar in size to a digital wristwatch. The electronic seal 20 will be removed from the latch area of the coin box 10 whenever the coins are dumped from the box and it will be replaced in the latch area of the coin box prior to sending the coin box out to the field.

Figure 2:
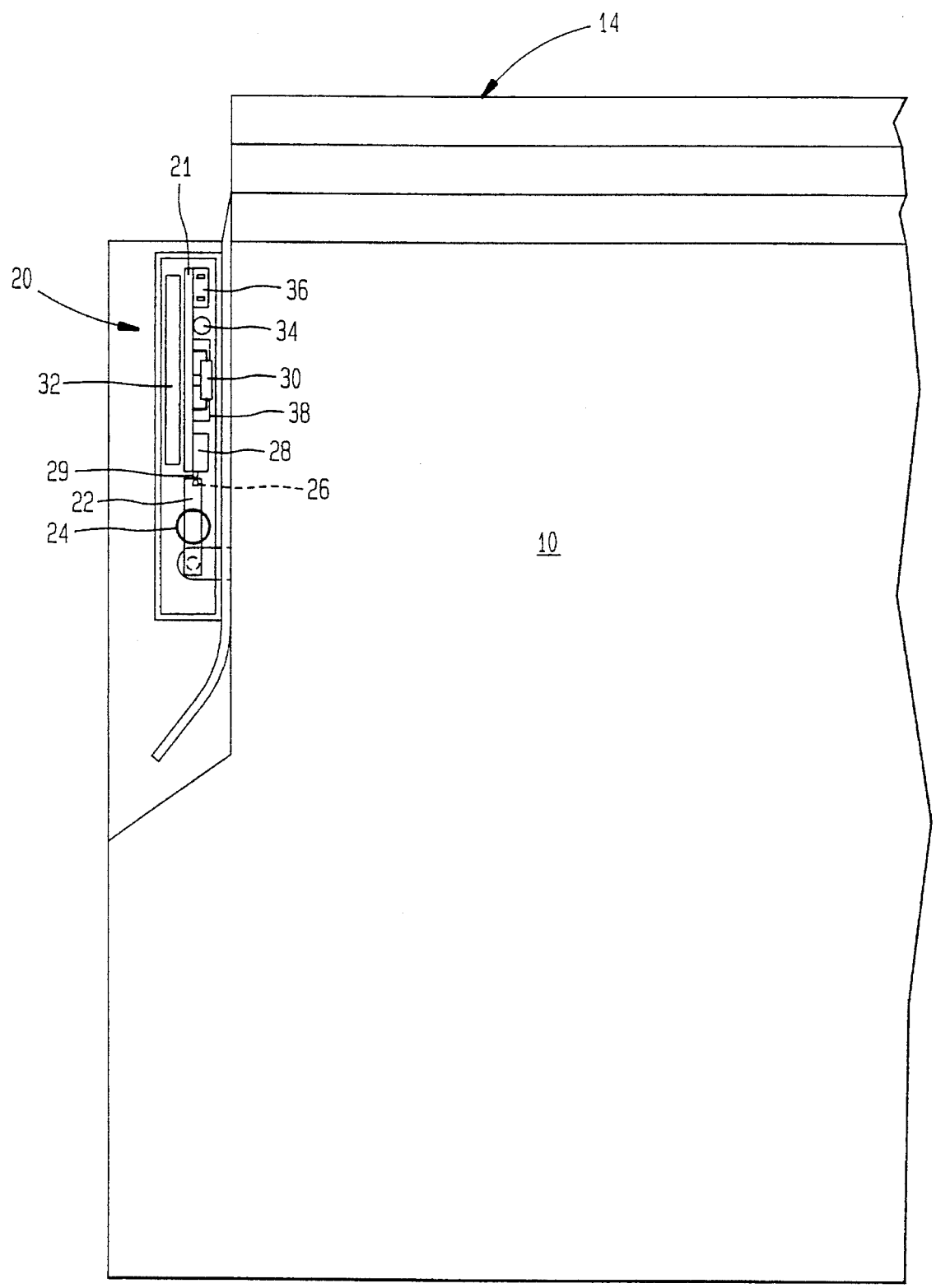
FIG. 2 is a side cross sectional view of the electronic seal of FIG. 1.

As shown in FIGS. 1 and 2, the electronic seal 20 has the latch pin 22 with a pin member 23 that in its operative, closed or extended position, shown in FIG. 1, is adapted to fit in the loop 15 after the latch 16 is placed over the loop. The latch pin spring 24 attaches the electronic seal 20 onto the coin box latch 16 and also triggers the switch 26.

In the embodiment shown, the switch 26 is a physical contact. The switch 26 can, however, be an optical interface that provides communications to indicate when the electronic seal 20 has disengaged from the latch 16.

As shown clearly in FIG. 2, the electronic seal 20 has a substrate 21. The substrate 21 is a base for the printed circuit board that is formed with certain components of the electronic seal 20, namely the LED 28, the timer chip 30, the crystal 34, the phototransistor 36, the plurality of resistors and capacitors 38, and the plurality of diodes 48 (shown in FIG. 3). In the preferred embodiment, the elements of the printed circuit board, namely the LED 28, the timer chip 30, the crystal 34, the phototransistor 36 and the plurality of resistors and capacitors 38 and the plurality of diodes 48 are on the one side of the substrate, while the power supply 32 is adapted to be secured to the other, opposite side of the substrate 21. The substrate 21 provides the electrical connection amongst the components of the printed circuit board.

The switch 26 is connected to and is positioned along side of the substrate 21. The latch pin 22 is operatively connected to the switch 26 and the latch pin spring 24. The latch pin 22 and the latch pin spring 24 are not part of the printed circuit. In a preferred embodiment, a pair of switch contacts 29 are provided. At least one switch contact 29 is, preferably, part of the printed circuit, and the other is connected to the switch 26.

Figure 3:
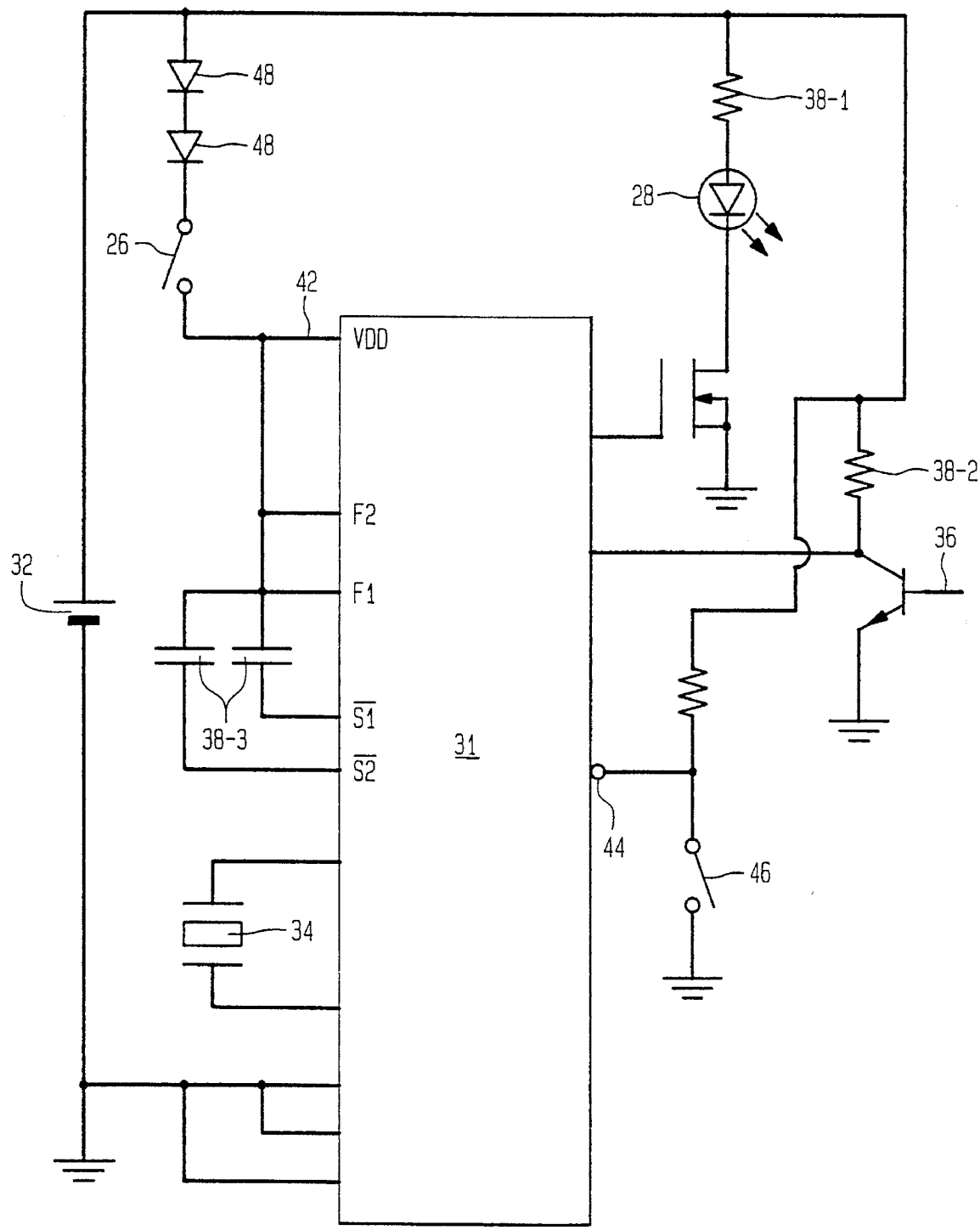
FIG. 3 is a schematic view of the timer circuit of the electronic seal of FIG. 1.

It is believed that the most basic and cost effective implementation of the electronic seal 20 is by using a standard timer chip that includes a serial clock 31, shown in FIG. 3, as the timer chip 30. The serial clock 31 is, preferably, the same as a digital watch clock, such as, for example, a Seiko S-3500A3 serial clock. This serial clock 31 provides the analogous function as the timer in a digital watch. When the electronic seal 20 is placed on the coin box, the pin member 23, that mates with the coin box latch 16 and loop 15, moves from its opened or retracted position to its extended position at which it secures the electronic seal to the loop 15. When moved to the extended position, the latch pin 22 activates the switch 26 that in turn permits power to the timer chip 30 to initiate the count of the clock 31 of the timer chip. The serial clock 31 continues counting until the pin member 23 of the latch pin 22 is again retracted so that the switch 26 is deactivated and power ceases to flow to the timer chip 30 and, thus, the serial clock.

An advantage of the present electronic seal 20 over the above presently known methods is that this electronic seal lends itself to the implementation of an electronic time stamp that records when the enclosure has been opened.

The present electronic seal 20 is designed to also lend itself to automation, such as in the coin counting operation.

The coin counting center will be equipped with communications devices to automatically send and receive electronic information to and from the electronic seal 20. In an alternative embodiment, the electronic information can possibly be encrypted information.

An alternative embodiment envisioned is that the electronic seal 20 may be implemented with a custom or application specific integrated circuit. This could afford a higher level of integration and eliminate the requirement of many of the discrete components of the present embodiment, such as the resistors and capacitors. This approach affords additional functions such that the seal upon removal reports the present time count automatically. This reduces the complexity of the data exchange and interface device that receives the time count from the present seal embodiment.

Another alternative embodiment envisioned is that the electronic seal 20 may possibly be implemented in a purely mechanical fashion. For example, rather than relying on an integrated circuit timer chip 30 or a microcontroller chip to detect and record when the lid 14 of the coin box has been opened, a mechanical gear assembly, the size of a wristwatch gear assembly, can be used to implement a counter whenever the latch 16 is opened or closed. Thus, visible markings on the gears may be used to determine whether the state of the seal has been altered. In many instances, the implementation will permit the desired security provided the gear mechanism is ratcheted to only increment positively and there are a large number of increments available.

The security of the electronic seal 20 relies on a database that is maintained in the coin counting center. The telephone coin boxes are coded with unique codes, such as, for example, unique bar codes. Each electronic seal 20 is identified by the bar code on the coin box along with a record of when the electronic seal was last initialized at the coin counting center. As stated above, the pin member 23 of the latch pin 22 must be retracted to violate or remove the electronic seal 20. The retraction of the latch pin 22 by the latch pin spring 24 resets the serial clock 31 in the timer chip 30 and the elapsed time will no longer match the count maintained by the database at the coin counting center.

The electronic seal 20 communicates with the database by the LED 28 and the phototransistor 36 that are accessible through transparent openings in the body of the electronic seal. A communications device (not shown), that includes a similar LED and a similar phototransistor, is placed in proximity to the electronic seal 20 so that it can communicate with those on the electronic seal. For the electronic seal 20 to communicate or provide the read information to the communications device, an output enable pin 44 must be grounded. This can be done by the use of a second switch 46 as shown in FIG. 3. Alternatively, the timer chip 30 can be provided with a second phototransistor (not shown) to permit the information to be forwarded to the communications device or a remote location or a network coupled to the phototransistor 36.

Prior to removal of the electronic seal 20 from the latch 16, the information communicated consists of the reading of the current count in the timer chip 30. Upon placement of the electronic seal 20 on the latch 16, the time is set or reset when the latch pin 23 retracts and the count begins.

In the database, the electronic seal count (i.e., the count noted when the electronic seal 20 is removed from the coin box latch 16) is either compared with the count maintained in the database or the count is reset to a known value, such as, for example, in the case of the Seiko chip, Jan. 1, 1988, by placement of the electronic seal back on the coin box latch 16. In either instance, the count is related to the coin box bar code data.

In a preferred embodiment, the electronic seal 20 has a preferred timer circuit shown in FIG. 3. The timer chip 30 has the clock 31 that is reset upon interruption of power. This feature provides for resetting of the electronic seal 20.

The switch 26 is connected between the power supply 32 and a supply lead 42. The switch 26 is also attached, as shown in FIG. 1, to the latch pin 22 that mates with the coin box latch 16. The latch pin 22 is spring loaded and remains in a normally closed or extended position so that the switch 26 is closed thus providing power from the power supply 32 to the clock 31 of the timer chip 30. The state of the switch 26 changes to an open condition (or grounded condition in an alternative embodiment) when the latch pin 22 and, in particular, the latch pin member 23, is physically and intentionally pushed out of the latch 16 to its opened or retracted position. The opened condition of switch 26 interrupts power to the timer chip 30, thereby causing the clock 31 and the timer chip 30 to reset. The electronic seal 20 cannot, therefore, be removed or placed on the coin box 10 without resetting the counter. Each time the switch 26 closes, e.g. the pin member 23 engages the loop 15, the count is reset.

As stated above, the electronic seal 20 communicates the elapsed count to the communications device by the LED 28 of the electronic seal. For communications to take place, the output pin 44 of the serial clock 31 must be grounded through the switch 46 (or a phototransistor in an alternative embodiment). The switch 46 is activated by the communications device. The clock signal from the communications device is received by the phototransistor 36 of the electronic seal 20, and communications must be completed before activating the latch pin 23. Once the latch pin 23 has been activated, the timer chip 30 will reset and a new count will begin. The count is outputted from the electronic seal 20 through the LED 28 to the communications device in serial bit stream in synchronism with the external clock supplied by the communications device.

The timer circuit shown in FIG. 3 is expected to have a useful life of at least 3.5 years based on the frequency of use demanded by current public telephone operation. As shown in FIG. 3, the circuit also includes a pair of diodes 48, a first resistor 38-1 between the power supply 32 and the LED 28, and a second resistor 38-2 between the power supply and the phototransistor 36. These resistors 38-1 and 38-2 act to impede the flow of current from the power supply 32 to the LED 28 and to the phototransistor 36, respectively. In addition, the timer chip 30 includes a pair of capacitors 38-3. The crystal 34 serves to stabilize or provide for the generation of a fixed frequency. The phototransistor 36 is, preferably, infrared sensitive to facilitate receipt of the clock signal from the communications device.

The electronic seal 20 is powered by the power supply 32. The power supply 32 is, preferably, a lithium battery. A lithium battery was selected for its size, temperature characteristics, and amp-hour rating. It is also preferred that the lithium battery be a three volt battery. The preferred lithium battery is sold under the style BR2016, for example, tradename Rayovac BR2016.

Figure 4:
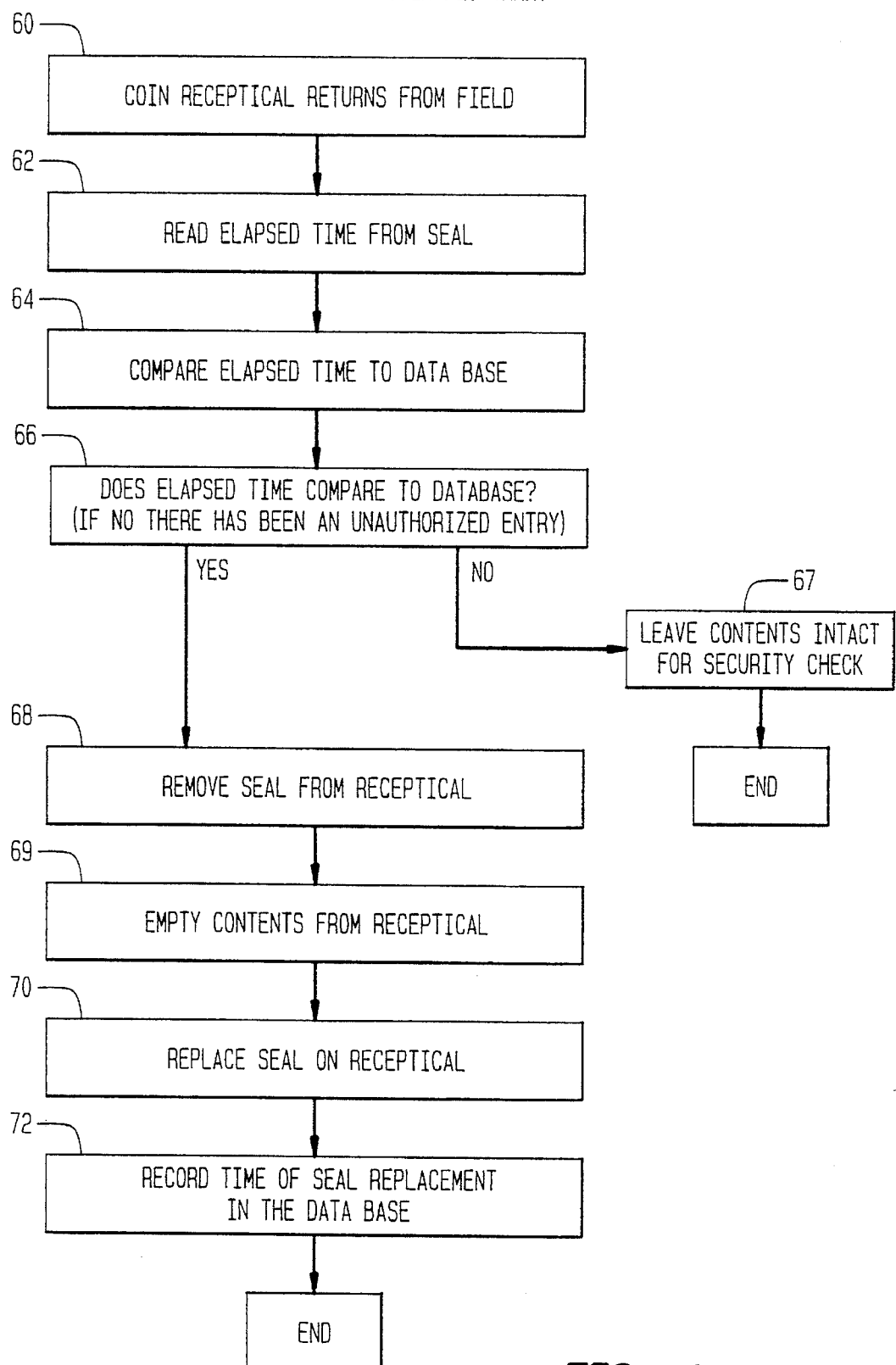
FIG. 4 is a system flowchart of the application of the electronic seal when used with a pay telephone.

FIG. 4 is a flowchart that illustrates the logic for the method of use of the electronic seal 20 with a pay or public telephone. The first step 60 is that the coin box or receptacle returns from the field. The elapsed time from the electronic seal 20 is then read (step 62), and compared to the elapsed time noted at the data base (step 64). If the elapsed time does not compare to the time in the data base (step 66), an unauthorized entry has been detected and the coin box should be left for security (step 67). If the elapsed time does compare to the data base, the electronic seal is removed from the coin box (step 68), the coins from the coin box are emptied (step 69), and the electronic seal is replaced on the coin box (step 70). The time of replacement of the electronic seal onto the coin box is recorded in the data base (step 72) and the coin box is ready to be sent back into the field.

Figure 5:
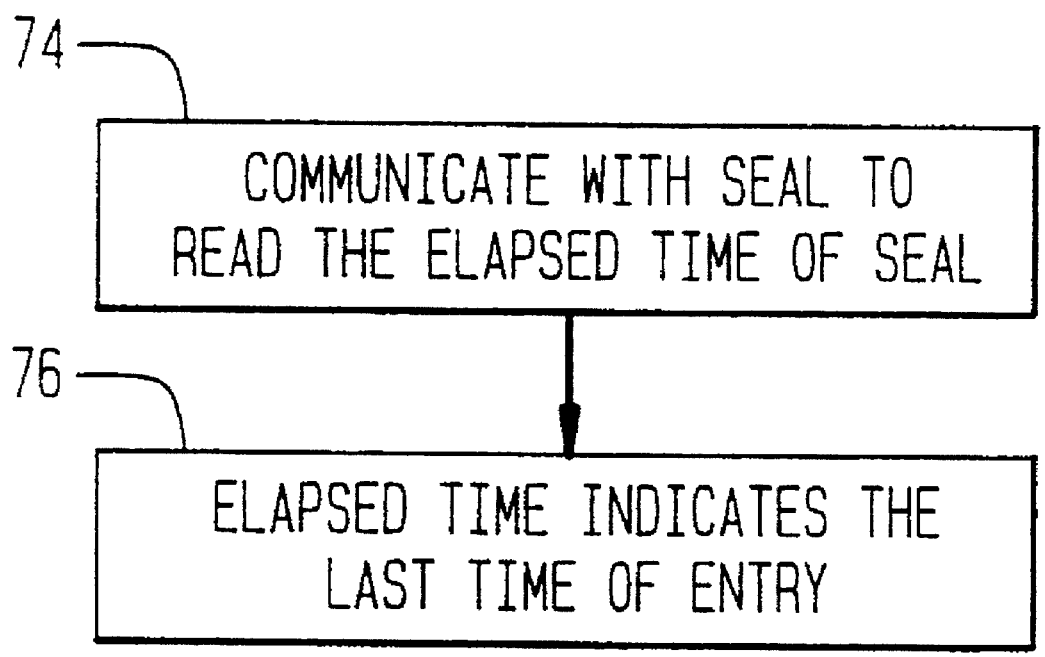
FIG. 5 is a system flowchart of the application of the electronic seal when used in other environments.

FIG. 5 is a flowchart that illustrates the use of the electronic seal 20 in other environments, such as those, set forth above. In this embodiment, there are two steps 74, 76. Step 74 provides that the communications device communicates with the electronic seal to read the elapsed time of the electronic seal. The elapsed time indicates the last time of entry into the structure being protected (step 76).

Having thus described the present invention with particular references to the preferred forms thereof, it will be obvious that various changes and modifications may be made therein without departing from the spirit and scope of the invention as defined by the appended claims.

What we claim:

1. A reusable electronic seal device removably attached to a door of a container having a latch for detecting that the door has been opened, said electronic seal including:

a latch pin having a retracted position when the door is open and an extended position when the door is closed;

a latch pin spring operatively connected to said latch pin for urging said latch pin to its extended position to secure said electronic seal to the latch of the container;

means for emitting a frequency signal;

a timer chip for receiving the frequency signal;

means operatively connected to said latch pin and said timer chip, for permitting the frequency signal to flow through said timer chip when said latch pin is in the extended position and for preventing frequency from reaching said timer chip when said latch pin is in its retracted position to derive a time count indicative of the state of the seal, wherein said electronic seal detects whether the door of the container has been opened, and wherein said electronic seal is not damaged when removed from the door.

2. The device according to claim 1, wherein said electronic seal further includes means for generating said frequency signal to said timer chip and means for supplying power to said timer chip and said generating means.

3. The device according to claim 2, further comprising a plurality of resistors and capacitors operatively connected to said timer chip.

4. The device according to claim 3, further comprising a plurality of diodes operatively connected to said timer chip.

5. The device according to claim 2, wherein said supplying means includes a battery.

6. The device according to claim 5, wherein said battery is a lithium battery.

7. The device according to claim 2, wherein said generating means is a crystal.

8. The device according to claim 1, wherein the container is a coin box of a pay telephone, and wherein the door is a lid of the coin box.

9. A reusable electronic seal device removably attached to a latch of a door of a container for detecting that the door has been opened, said electronic seal including:

a latch pin having a retracted position when the door is open and an extended position when the door is closed;

a latch pin spring for urging said latch pin to the extended position to secure said electronic seal to the container;

a switch operatively connected to said latch pin and adapted to be activated when said latch pin is in the extended position; and means for emitting a frequency signal;

a timer chip for receiving the frequency signal, and operatively connected to said switch, wherein said has frequency signal flows through said timer chip when said switch is activated, wherein said swatch stops the frequency signal from reaching said timer chip when said latch pin is in its retracted position to derive a time count indicative of the state of the seal, wherein said electronic seal is not damaged when removed from the door.

10. The device according to claim 9, further comprising means for supplying power to said timer chip and said emitting means, wherein said switch is deactivated and power ceases to said timer chip when said latch pin is retracted.

11. The device according to claim 10, wherein said electronic seal further includes a plurality of resistors and capacitors, and a plurality of diodes.

12. The device according to claim 10, wherein said supplying means includes a battery.

13. The device according to claim 10, wherein said generating means is a crystal that provides stable oscillation so that said timer chip maintains accurate time.

14. The device according to claim 9, wherein said electronic seal further includes a phototransistor for receiving a clock signal from an external communications device and a light emitting diode for sending a time count to the external communication device.

15. The device according to claim 14, wherein said light emitting diode is an infrared light emitting diode.

16. The device according to claim 9, wherein said electronic seal further includes a substrate operatively connected to said switch, having said timer chip, a light emitting diode, a phototransistor, and said emittive means positioned on one side of said substrate and operatively connected together by said substrate, and having power supply means positioned on the other side of said substrate.

17. The device according to claim 16, wherein said supplying means is removably connected to said substrate.

18. The device according to claim 16, wherein said substrate with said timer chip, said light emitting diode, said phototransistor, and said generating means form a printed circuit board assembly.

19. The device according to claim 9, wherein said timer chip has a clock.

20. The device according to claim 9, wherein said switch resets said timer chip when said latch pin spring urges said latch pin to its extended position to secure said electronic seal to the door of the container.

21. The device according to claim 9, wherein said electronic seal is permanently mounted to the container.

22. The device according to claim 9, wherein said electronic seal is permanently mounted to the door of the container.

23. The device according to claim 9, wherein the container is a coin box of a pay telephone, and wherein the door is a lid of the coin box.

24. A reusable electronic seal removably attached to a door of a container for detecting that the door has been opened, wherein the door has a latch, said electronic seal including:

a latch pin having a retracted position when the door is open and an extended position when the door is closed;

a latch pin spring operatively connected to said latch pin for urging said latch pin to the extended position in which said electronic seal is secured to the latch of the container;

a switch operatively connected to said latch pin, said switch adapted to be activated when the latch pin is in the extended position;

means for generating a fixed frequency signal to a timer chip to derive a time count indicative of the state of the seal;

said timer chip receiving the fixed frequency signal, and operatively connected to said switch, wherein a timer frequency signal flows through said timer chip in response to said fixed frequency signal and when said switch is activated, said switch stopping the fixed frequency signal from reaching said timer chip when said latch pin is in its retracted position to terminate the time count;

a phototransistor, operatively connected to said timer chip, for receiving a clock signal from an external communications device for synchronizing communications with the external communications device;

a light emitting diode, operatively connected to said timer chip, for communicating the time count to the external communications device; and means for supplying power to said timer chip, said generating means, said phototransistor and said light emitting diode, wherein said electronic seal is adapted to detect whether the door of the container has been opened, and wherein the electronic seal is not damaged when removed from the door.

25. The device according to claim 24, wherein said light emitting diode is an infrared light emitting diode.

26. A reusable electronic seal removably attached to a lid of a coin box of a pay telephone to detect that the lid has been opened, wherein the lid has a latch, said electronic seal including:

a latch pin having a retracted position when the lid is open and an extended position when the lid is closed;

a latch pin spring operatively connected to said latch pin for urging said latch pin to the extended position in which said electronic seal is secured to the latch;

a switch operatively connected to said latch pin, said switch adapted to be activated when the latch pin is in the extended position;

means for generating a fixed frequency signal to a clock of a timer chip to derive a time count indicative of the state of the seal;

said timer chip operatively connected to said switch, wherein said timer chip has said frequency signal flowing through said clock when said switch is activated, said switch stopping the frequency signal from reaching said timer chip when said latch pin is in its retracted position to terminate the time count;

a phototransistor, operatively connected to said timer chip, for receiving a clock signal from an external communications device for synchronizing communications with the external device;

a light emitting diode, operatively connected to said timer chip, for communicating the time count to the external communications device; and means for supplying power to said timer chip, said generating means, said phototransistor and said light emitting diode, wherein said switch prevents said frequency signal from reaching said timer chip when said latch pin is in the retracted position, and wherein said switch resets said timer chip when said latch pin spring urges said latch pin to the extended position to secure said electronic seal to the lid of the coin box.

* * * * *